United States Patent
Strohbach et al.

(10) Patent No.: US 8,676,228 B2
(45) Date of Patent: Mar. 18, 2014

(54) TRACKING SYSTEM AND A METHOD FOR TRACKING THE POSITION OF A DEVICE

(75) Inventors: Martin Strohbach, Schriesheim (DE); Erno Kovacs, Stuttgart (DE)

(73) Assignee: NEC Europe Ltd., Heidelberg (DE)

( * ) Notice: Subject to any disclaimer, the term of this patent is extended or adjusted under 35 U.S.C. 154(b) by 80 days.

(21) Appl. No.: 13/147,444

(22) PCT Filed: Feb. 2, 2010

(86) PCT No.: PCT/EP2010/000601
§ 371 (c)(1),
(2), (4) Date: Oct. 14, 2011

(87) PCT Pub. No.: WO2010/086188
PCT Pub. Date: Aug. 5, 2010

(65) Prior Publication Data
US 2012/0021760 A1    Jan. 26, 2012

(30) Foreign Application Priority Data
Feb. 2, 2009   (EP) ..................... 09001374

(51) Int. Cl.
*H04W 24/00*    (2009.01)
(52) U.S. Cl.
USPC ............ 455/456.1; 455/404.2; 455/63.4; 455/25; 455/524; 455/67.17
(58) Field of Classification Search
USPC .......... 455/456.1, 404.2, 63.4, 25, 524, 67.17
See application file for complete search history.

(56) References Cited

U.S. PATENT DOCUMENTS

| | | | |
|---|---|---|---|
| 4,884,208 A | 11/1989 | Mainelli et al. | |
| 6,097,958 A | 8/2000 | Bergen | |
| 6,385,454 B1 | 5/2002 | Bahl et al. | |
| 6,674,403 B2 | 1/2004 | Gray et al. | |
| 6,717,516 B2 | 4/2004 | Bridgelall | |
| 7,826,837 B1 * | 11/2010 | Sylvester | 455/423 |
| 2002/0005804 A1 * | 1/2002 | Suprunov | 342/457 |
| 2003/0144009 A1 | 7/2003 | Nowlin | |
| 2003/0161265 A1 | 8/2003 | Cao et al. | |

(Continued)

FOREIGN PATENT DOCUMENTS

| | | |
|---|---|---|
| DE | 10 2005 041 453 A1 | 3/2007 |
| JP | H08307431 A | 11/1996 |

(Continued)

OTHER PUBLICATIONS

International Search Report, dated May 21, 2010, from corresponding PCT application.

(Continued)

*Primary Examiner* — Kwasi Karikari
(74) *Attorney, Agent, or Firm* — Young & Thompson

(57) ABSTRACT

For allowing a reliable and fast determination of the position of devices with a high degree of privacy preservation a tracking system for determination of the position of devices within a wireless network is claimed, wherein the tracking system is including a number of tracking stations, each tracking station being adapted for wireless communication with at least one device. The system is characterized by a management unit for control of a tracking activity of the tracking stations. Further, an according method for tracking the position of a device within a wireless network is claimed, preferably for use with the above mentioned tracking system.

20 Claims, 3 Drawing Sheets

(56) References Cited

U.S. PATENT DOCUMENTS

| | | |
|---|---|---|
| 2006/0074769 A1 | 4/2006 | Looney et al. |
| 2008/0186165 A1* | 8/2008 | Bertagna et al. ......... 340/539.13 |
| 2009/0149191 A1 | 6/2009 | Luers |
| 2009/0298483 A1* | 12/2009 | Bratu et al. ................ 455/414.2 |

FOREIGN PATENT DOCUMENTS

| | | |
|---|---|---|
| JP | 2003090738 A | 3/2003 |
| JP | 2003283565 A | 10/2003 |
| JP | 2004282456 A | 10/2004 |
| JP | 2007506308 A | 3/2007 |
| WO | 2005/027553 A1 | 3/2005 |
| WO | 2005027553 A1 | 3/2005 |
| WO | 2008156579 A1 | 12/2008 |

OTHER PUBLICATIONS

Translation of Japanese Office Action, dated Jan. 28, 2013, from corresponding JP application.

* cited by examiner

TRACKING SYSTEM AND A METHOD FOR TRACKING THE POSITION OF A DEVICE

BACKGROUND OF THE INVENTION

The present invention relates to a tracking system for determination of the position of devices within a wireless network, wherein the tracking system is comprising a number of tracking stations, each tracking station being adapted for wireless communication with at least one device. Further, the present invention relates to a method for tracking the position of a device within a wireless network, wherein the tracking system is comprising a number of tracking stations, each tracking station being adapted for wireless communication with at least one device.

DESCRIPTION OF THE RELATED ART

Tracking systems and methods for tracking the position of a device within a wireless network of the above mentioned type are known from the state of the art. For example, U.S. Pat. No. 6,717,516 B2 is showing a tracking system with multiple tracking stations and zones for tracking. Further, from U.S. Pat. No. 6,674,403 B2 is known a tracking system in a wireless network. The known tracking system uses knowledge of adjacency to improve the location and position determination.

Further known tracking systems determine the position of devices by scanning for a radio signal emitting from that device utilizing multiple tracking stations. Using various forms of triangulations and trilateration the device position can be determined. But this requires the tracked devices to emit a radio signal. Usually this radio signal can be measured by not authorized listeners thus providing several privacy and security problems.

Tracking and positioning systems are used to determine the location of users and the proximity of users/devices. There is a huge commercial interest in this type of supporting services. Unfortunately, there are great problems with privacy. These problems are a major reason preventing the large-scale use of location/proximity. Further technical problems are issues with costly deployments, speed of measuring the information, and accuracy of the measurements, e.g. environment condition like indoor/outdoor.

Tracking systems sometimes use existing wireless technologies invented for non-tracking purposes (e.g. Bluetooth, UWB (Ultra-Wideband), IEEE 802.15.x) for tracking. These wireless networks provide means for discovering devices in their vicinity. This is usually a needed first step in establishing connectivity. For example, Bluetooth in INQUIRY mode allows finding "visible" devices in the vicinity. This mode can be used for tracking systems without introducing new hardware devices. But they introduce even more security/privacy risks, as mentioned above, as they use methods designed for different purposes and not having security/privacy in mind. Furthermore, the method is slow and might therefore not be suitable for some application areas.

"Invisible" devices, i.e. devices not in discovery mode, cannot be found with this method. As said, devices want to be invisible in order to protect the privacy of their users. Nevertheless, especially in Bluetooth, but probably also in other existing and future wireless technologies, when initial contact has been established once, a device can check the availability of an "invisible" device in its proximity through e.g. trying to invoke an operation, such as establishing a L2CAP (Logical Link Control and Adaptation Protocol) connection and do a "service discovery" in the Bluetooth case. This is sometimes called "pinging the device" though it is not an IP ping and technically not really a ping.

Furthermore, device discovery and device "pinging" can be used for detecting a device in proximity with various characteristics. For example, a Bluetooth "ping" is much faster then a Bluetooth discovery operation (0.8-2 s seconds compared to 7-20 seconds [see http://www.sigmobile.org/mobisys/2006/posters/Handurukande.pdf]). This gives further reasons to use the "ping" operation: speed of discovery adds to the fact that the device can stay in invisible mode. On the other hand, the discovery mode can discover several nearby devices at the same time.

Given the increasing need for privacy and hiding devices, future wireless networks will have even more and strict security mechanisms built into them. One example is a changing MAC address in order to support a Virtual Identity (see Daidalos V-ID) concept. Utilizing this technology, above mentioned detecting of "invisible" device might get even more complicated and needs sophisticated support systems.

In summary, current state-of-the-art wireless tracking systems are usually utilizing a discovery mode, violating the user's privacy and usually allowing everybody to scan for devices in the vicinity. Some problems related to this are
- revealing the user's location and movement patterns to everybody being able to scan for devices;
- slow speed due to physical characteristics and waiting for time outs;
- need for users to switch to discovery mode. Giving the raised concerns about privacy, it is likely that the use of public discoverable devices will decrease. Furthermore, the need to switch on the Discovery Mode gives raise to usability issues as this is not easy on some of the existing mobile devices.

Other tracking systems are known from U.S. Pat. No. 4,884,208 and from US 2006/0074769 A1.

Further tracking systems and Bluetooth discovery mechanisms are known from the following websites:
 http://www.bluetoothtracking.org/
 http://www.m-travel.com/news/2002/03/bluetooth-_track.html
 http://www.loca-lab.org/
 http://media.cseeltu.se/publications/2002/hallberg02bluetooth.pdf

SUMMARY OF THE INVENTION

It is an object of the present invention to improve and further develop a tracking system and a method for tracking the position of a device within a wireless network for allowing reliable and fast determination of the position of devices with a high degree of privacy preservation.

In accordance with the invention, the aforementioned object is accomplished by a tracking system comprising the features of claim 1 and a method for tracking the position of a device within a wireless network according to claim 20. According to claim 1 the system is characterized by a management unit for control of a tracking activity of the tracking stations. According to claim 20 the method for tracking the position of a device within a wireless network is characterized by controlling of a tracking activity of the tracking stations by a management unit.

According to the invention it has been recognized that a fast and reliable determination of the position of devices is possible by a tracking system which is comprising a management unit for control of a tracking activity of the tracking stations. By such a management unit an individual and selective control and activity of each tracking station is provided. Further, the inventive tracking system and method do not rely on periodically broadcast and visible-to-all radio signals. Instead the system and method can "ping" the devices it knows about. This will reduce overall traffic and will result in a fast detection and determination of the position of devices. By the possibility of using the "ping"-mechanism security/privacy risks are avoided. Further, the inventive system and method can use existing, widely used technology, such as Bluetooth technology.

Within a preferred embodiment of the invention the tracking stations could be adapted for pinging of a device and/or for invoking an operation of a device. Using the "pinging" mode the devices tracked by the tracking stations can stay hidden and must not be put into discover mode.

Preferably, the management unit could be adapted for scheduling which device shall be pinged by which tracking station, preferably within which time interval. Thus, not all tracking stations have to track all devices and a very selective tracking process is possible saving system resources. Such a scheduling can be dynamically adapted over the time.

Preferably, the scheduling could be based on previous sightings and/or on the importance of previous sightings of the respective device and/or on the necessary accuracy or QoS (Quality of Service). This could include learning some movement patterns and the respective probabilities. As a result, the tracking system and method are using wireless discovery and pinging with a management unit that schedules discovery or ping mode.

Within a preferred embodiment the scheduling could be based on a potential walkway of the respective device. Based on the potential walkway the management unit could activate tracking stations which are near such a walkway or within such a walkway.

Within a preferred special operation, the tracking stations could be controlled by the management unit for immediately pinging a definable device. In other words, the management unit could ask the tracking stations to immediately ping a device. As a result, a highly reactive system can be realized.

Within a further preferred embodiment the management unit could comprise a registration module for registering a device and/or an identity and/or an access policy. A user can register multiple devices and/or identities by such a registration module.

Further, the management unit could comprise an activation module for activation and/or deactivation of tracking of a device. Utilizing an activation module, users can activate and deactivate tracking for a registered device. By the registration and activation the user can provide an opt-in for enabling tracking of the respective device.

Preferably, an access policy and/or a priority and/or a definable QoS (Quality of Service) is determinable preferably as part of an activation of tracking. Such a determination of characteristics of the tracking as part of an activation of tracking will provide a very simple handling of the tracking system and a simple method for tracking the position of the device.

Regarding QoS, the users will most likely not specify directly the QoS parameters at measurement time, but rather a user-oriented range of parameters (e.g., "ensure guaranteed detection at walking speed, ensure guaranteed detection while reading sign, ensure guaranteed detection while staying in area"). These two modules are also used to support future wireless technologies with changing MAC (Media Access Control) addresses.

Preferably, the management unit could comprise an access module for permitting access by services to a tracking information.

Within a further preferred embodiment the management unit could comprise a mash-up module for receiving events and/or information from other systems or sources. Further, such a mash-up module could provide for communicating with other systems or sources. A mash-up with external other systems could improve the tracking behaviour based on observations by the other systems. Such other systems or sources could comprise a preferably GPS-based positioning system, a cell-phone and/or a calendar, which can generate relevant events.

The mash-up module could further comprise an API (Application Programming Interface) with access control.

Within a further preferred embodiment of the invention the management unit could comprise a learning module for predicting a movement pattern or a potential walkway of a device. Such a prediction could be used for scheduling the tracking stations relevant for the device.

Further preferably, the management unit could comprise a communication module for communication with tracking stations.

Within a very simple embodiment of the invention the management unit could be connected to the tracking stations by a wireless or cable connection. The specific realization of the connection is depending on the individual application case. Within a further simple construction the management unit could be integrated in a tracking station.

With regard to a very fast operation of the tracking system each tracking station could have several scanning queues that are scheduled with different priorities and/or timing. The tracking management unit could make sure that desired QoS for detecting devices is fulfilled. The management unit could insert the devices to be scanned into the right queue of the tracking stations.

For providing a widely usable system each tracking station could support multiple radio interfaces and/or multiple interfaces of the same technology.

Preferably, the tracking system could be realized as part of a display system, an indoor navigation system or a surveillance system. However, other applications are possible.

By the opt-in of users into the tracking system a high level of privacy is realized. Especially for future wireless networks with changing MAC addresses, this opt-in mode is a very important feature. As also the "ping" operation is taking time, the amount of devices that can be pinged is limited. As a consequence, the amount of devices that can be discovered is limited.

An advantage of the tracking management system and method according to the present invention is that it could manage the "ping" activity in such a way that the management unit could perform high precision measurements for devices already discovered in a specific area and/or needing close monitoring, while it occasionally checks for devices coming into a definable range. For that it could utilize information about the geo-position of tracking devices to estimate where a given device might be heading. For tracking stations along a definable or predictable walkway of a device, the device being tracked could be added to a queue of potentially arriving devices at said tracking stations. In such a way, the system can track a higher amount of devices while maintaining good QoS for the devices close by.

Preferably, the tracking could only be started when a positioning system is providing the information that the device might come into a definable range. Thus, the tracking system could benefit from events from other systems. For example, it could start the scanning process only when a GPS-based positioning system tells the tracking system that the device is close by and might come into the tracking range. For that a variety of "mash-up APIs" could be used.

Within a further preferred embodiment the management unit could schedule the time needed to perform one or more trackings of devices. In such a way a very effective tracking is possible.

As the amount of devices, which can be tracked by one tracking station is limited due to the time needed for detecting the device, the invention is providing a system and a method that optimizes the pinging of a device by respective scheduled tracking stations. In other words, the scale of system can be balanced against speed of discovery. As devices are scanned or individually pinged, a single device is discovered fast, but detecting many devices introduces scaling problems as each device needs to be pinged individually. Such scale problems can be counteracted with multiple tracking stations and intelligent scheduling of the pings. This is one advantage of the present invention and the control of a tracking activity of the tracking stations by a management unit.

The inventive tracking system is of high commercial relevance for all types of location and proximity-based systems. This includes digital signage, location-based advertisement, guidance system, personalization system (e.g. for IPTV), and many more.

For a realization of the tracking system a variety of existing technologies in existing devices can be used. This allows a cheap implementation of tracking stations, e.g. on the basis of Bluetooth technology.

The inventive system and method are allowing for preserving privacy by avoiding putting devices into discover mode. Further, it is possible to control who gets the tracked information based on user's policies. For privacy reasons users can be asked to opt-in for being tracked. In this case, known properties of their devices can be used.

The inventive system and method allow fast detection of devices in case such a high QoS is needed. The tracking system can intelligently schedule the activities of the various tracking stations in order to scan more devices while preserving privacy and speed. By learning algorithms the system can learn the expected behavior of users in order to improve prediction and a prediction based scheduling of tracking stations.

Further, a mash-up with external systems is possible to improve the tracking behavior based on observations by the systems. These external systems can be location-based systems, calendar systems, or other types of systems generating relevant events.

Such influencing of the tracking management can be realized by the mash-up module that allows receiving events or information from other systems. This could be—for example—a GPS-based positioning system that tells the tracking system that a user is coming into its vicinity. It could be the cell-phone detecting a cell-id of a base station close the tracking area. Or it could be a calendar telling the tracking system that the user is now scheduled to arrive in the area. Using the Mash-up module, the tracking system can improve scheduling of the tracking actions based on further knowledge about the user. Usage of the Mash-Up module can be organized during registration and activation.

The invention is providing a tracking system and method with the following summarized preferred features and properties:

A tracking management unit that optimizes the tracking system to increase capacity, performance and QoS. This might include a learning module trying to predict the movement patterns of users or devices.

Opt-in module supporting multiple identities and multiple devices.

Access Control for specialized services.

QoS parameters depending on the target application.

Mash-up module allowing the tracking system to interact with other systems to improve the tracking behavior.

The tracking system or method could utilize wireless discovery and pinging with the following important features:

A management unit that schedules discovery or ping mode. In ping modes it schedules which device is pinged at which tracking station based on the previous sightings of the device, the importance of the sighting, and the needed accuracy/QoS. This includes learning some movement patterns and the respective probabilities.

A registration, activation and access module including setting access policies, priorities, and QoS requirements. This includes support for future MAC-address changing wireless technologies.

A mash-up module that allows connecting the tracking system to other systems and receive events to improve the tracking behavior.

An API with access control and events for sending the tracked information to applications.

The management unit of the tracking system can optimize the schedules of the tracking stations by taking former sightings and potential walkways of the user into account;

learning potential walkways from analyzing sightings;

managing the time needed to do all "pinging" jobs;

trying to optimize energy consumption, especially on the mobile device being tracked;

trying to optimize the utilization of the radio spectrum in order to avoid unnecessary interferences;

interacting with other systems to learn when tracked objects might be around.

In addition to that, data privacy laws may be introduced that restrict what is allowed to do with "blind discovery or user tracking". But most of the laws allow tracking in case the user has consented to being tracked. This is another reason for requesting an opt-in module, which could be realized by a combination of a registration and activation module.

BRIEF DESCRIPTION OF THE DRAWINGS

There are several ways how to design and further develop the teaching of the present invention in an advantageous way. To this end, it is to be referred to the patent claims subordinate to patent claim 1 and to patent claim 20 on the one hand, and to the following explanation of a preferred example of an embodiment of the invention, illustrated by the drawing on the other hand. In connection with the explanation of the preferred example of an embodiment of the invention by the aid of the drawing, generally preferred embodiments and further developments of the teaching will be explained. In the drawings

DETAILED DESCRIPTION OF THE INVENTION

Figure 1:
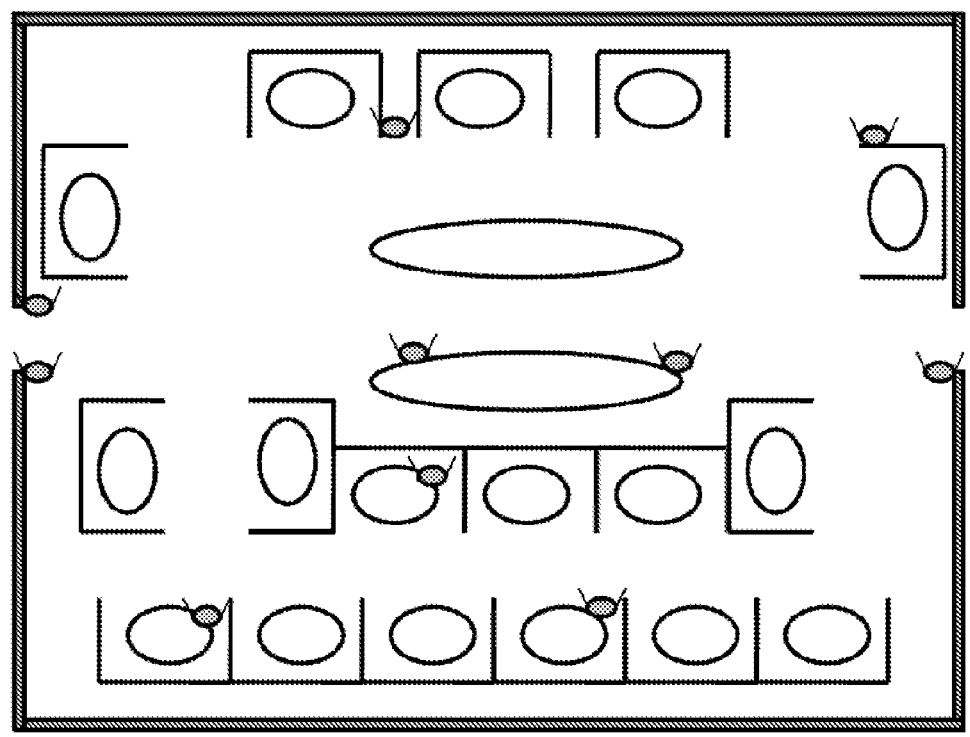
FIG. 1 is illustrating schematically a tracking system with several tracking stations.

FIG. 1 is illustrating schematically a scenario of a tracking system comprising several tracking stations. The embodiment could be a fair scenario wherein wireless devices can be detected by an arbitrary amount of tracking stations, which are controlled by a management unit (not shown). The management unit runs a management system that controls the tracking activities of the tracking stations. One operation is to set one or more tracking stations from discovery mode to "ping" mode or back. In "ping" mode it furthermore schedules which device shall be pinged by which tracking station in which time interval. This will influence the speed of the tracking process and can be dynamically adapted over the time. With a special operation, the management unit can ask the tracking stations to immediately ping a device. This can be achieved to realize a highly reactive system.

Figure 2:
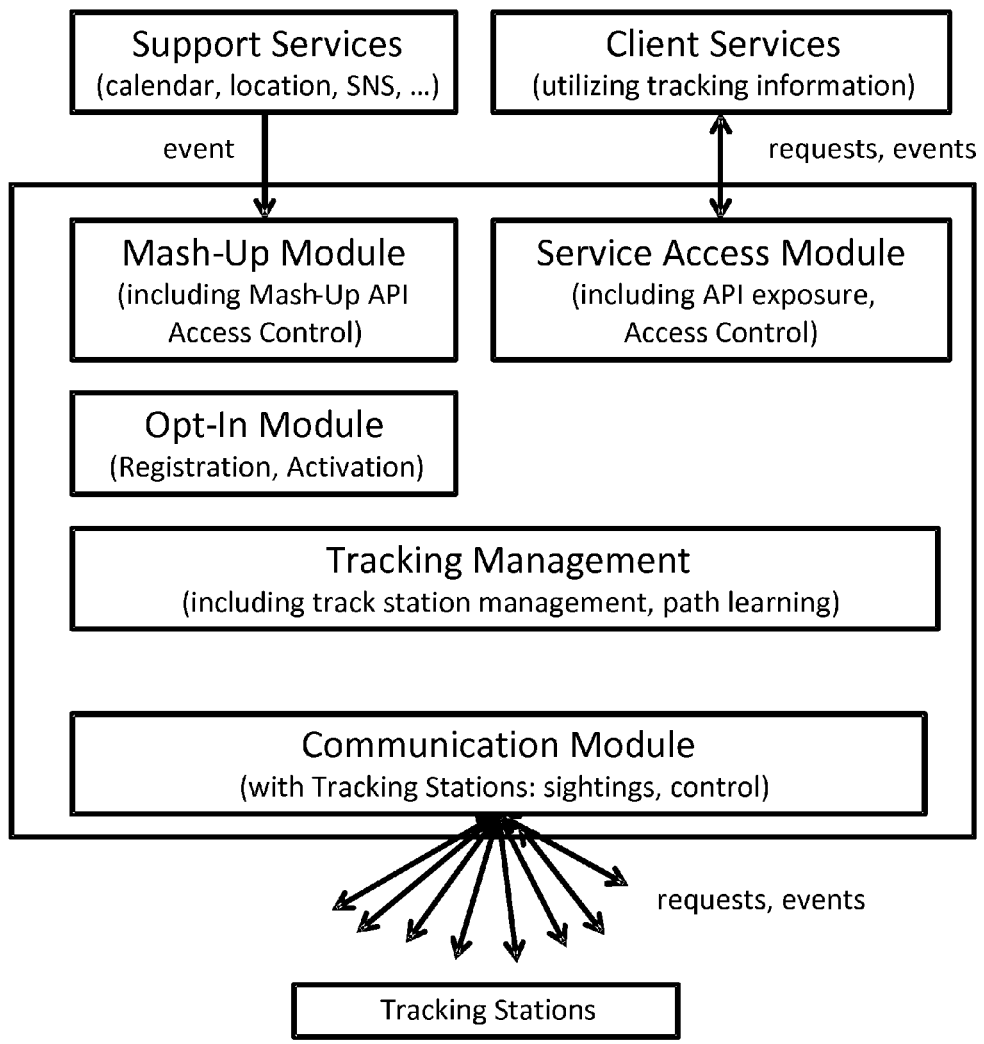
FIG. 2 is illustrating schematically a management unit for use within a preferred embodiment of a tracking system according to the present invention and FIG. 3 is illustrating schematically the communication of a management unit with a tracking station according to an embodiment of the present invention.

FIG. 2 is illustrating schematically a management unit of a preferred tracking system according to the invention. The management unit is in communication with several tracking stations on one hand and with support services and client services on the other hand. The management unit is comprising a mash-up module, a service access module, an opt-in-module and a communication module. Further, there is provided a tracking management module for tracking station management and path learning.

Figure 3:
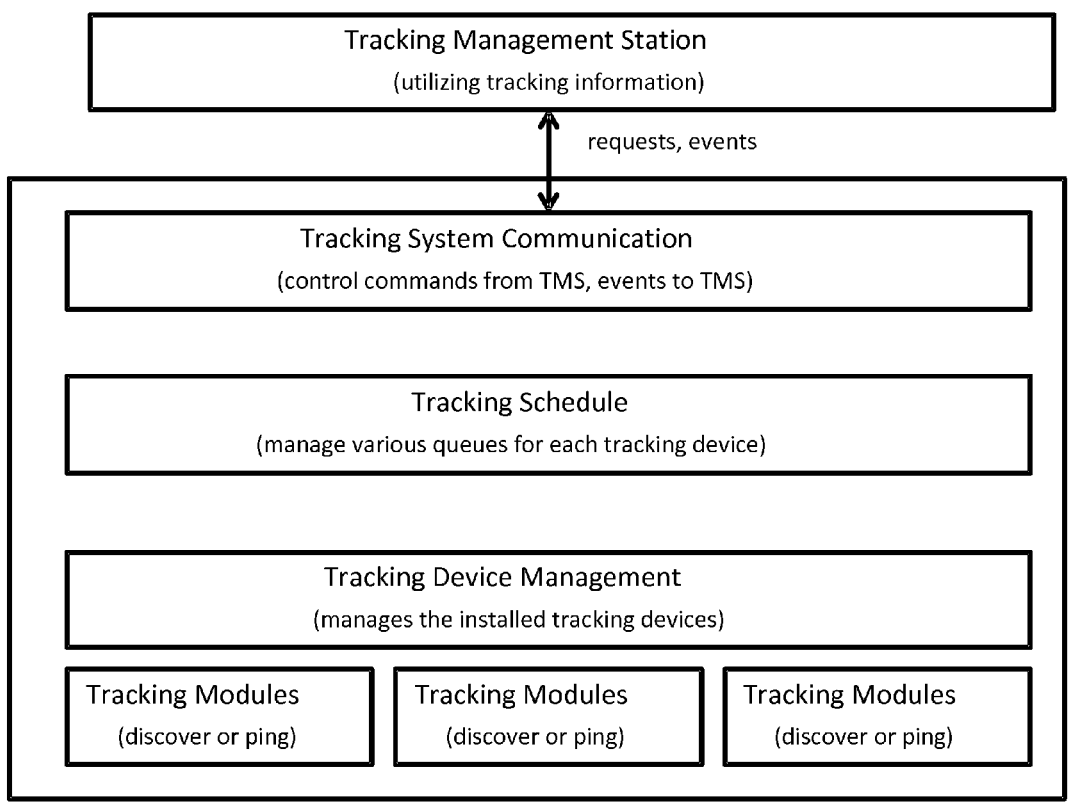

FIG. 3 is schematically illustrating the communication of the management unit with a tracking station. The management unit is designated as tracking management station and is positioned in the upper part of FIG. 3.

The tracking station of FIG. 3 is comprising different modules for tracking system communication, for tracking schedule and for tracking device management. Further, there are provided three tracking modules.

The embodiment of the invention is comprising the following important features:

Registration: user can register themselves, their identities (multitude of), and their devices (multitude of).

Activation: users can decide to activate one or more of their devices for tracking. Activations include the services that should be informed (multitude of) and the identity used (multitude of).

Activation can include the tracking networks for which the device shall be activated (e.g. the shop at main street and the mall at high street and the gas station), a schedule when the devices shall be tracked, a priority and a QoS requirement which the tracking management system can use for planning the scans. When the wireless system used allows it, each activation shall also contain the physical parameter (e.g. MAC address, frequency, etc.) to be used for the scanning.

Tracking System: the tracking system consists of tracking stations and a management unit which runs a tracking management system. The management unit or the management system coordinates the tracking stations.

Tracking Station: Each tracking station has several scanning queues that are scheduled with different priorities and timing. The tracking management system need to make sure that desired QoS for detecting users are fulfilled. Furthermore, the tracking station can be in discovery mode. Obviously tracking stations can support multiple radio interfaces as well as multiple interfaces of the same technology (such as multiple Bluetooth dangles).

Tracking Management: The management system manages the set of devices being tracked. It inserts the devices to be scanned into the right queue of the tracking stations. Furthermore it instructs tracking stations when to go to discover mode or roping mode. Thirdly, it receives the sightings observed by the tracking stations, stores them, and uses them for optimizing the internal behavior of the tracking system.

Access Module: This module provides the API for requesting sightings from an activation. It also contains the module that checks the requests against the given activations and filters not authorized request and events.

Mash-up Module: allowing connecting the tracking system to various other systems, e.g. a GPS-based location system or a online calendar. This can be used to optimize the initial detection of devices.

Use Cases

Supermarket Scenario:

The present invention can be used to enhance a supermarket or shopping mall. Users are provided with a service that enables them to first define their shopping list. Second, when they go to the supermarket, the supermarket provides a system that navigates the user to the desired products and informs him about special offers.

For that, the users send their shopping list to the supermarket including their tracking activation. When arriving at the shop, the tracking system starts monitoring the user. For optimization, the tracking system was set up in such a way that the shop is divided into several zones, each of them tracked by one or more tracking stations. The tracking management system or unit knows the zones and knows from previous measurements that when users are tracked by a station at the edge of the zone, that there is a certain likelihood that they move into another zone. For that case, it instructs the tracking stations in that other zone to scan for the devices at a lower schedule. When sighted in the other zone, the tracking management system or unit removes the devices from being tracked in Zone A and instructs the tracking stations in Zone B to ping the devices at a higher rate.

The service the tracking is used for might require a better QoS of the tracking in certain areas of the shop to ensure that a service is reactive and well received by the users. For that case, the tracking system can decide to increase the scan rate once the user enters specific zones of the shop.

For the guidance of the user, the tracking stations might be integrated with a public display system.

Fair Scenario:

In this scenario, a visitor schedules a meeting at a fair booth. For supporting measurements, the user allows the system to track him and also gives access to his calendar saying when he plans to be at the booth. At the scheduled time, the tracking system looks for the user and informs the hosting party about the user. This is an example for using the mash-up module.

In this scenario tracking stations might be deployed at each booth and the management system might be operated by the fair management.

Details of the Use Cases:

(1) Supermarket

The Tracking Management System will run on a server machine that is connected to the network (wired or wireless) inside the supermarket. Several tracking stations will be set up, e.g. at the entrance and exit areas, at the cashier, in front of in-store displays, close to highly searched shelves. The tracking stations will be equipped with Bluetooth dongles for discovery and pinging of normal consumer devices NFC (Near Field Communication) touch points having near-field wireless detection of end-users devices.

Standard mobile phones with Bluetooth are handled by Bluetooth, special mobile phones with NFC or Customer Loyalty cards with NFC are handled by the NFC reader. In areas like entrance and exits, the tracking stations are equipped with multiple Bluetooth readers to increase the scanning capacity.

The Tracking Management System is also running a Web server and an application that allows customers to register their devices (using the Registration module). Furthermore, the application enables customers to provide an edit of a shopping list. When finishing the shopping list, the customer can activate the tracking system and set a specific time when he will be at the shop.

Furthermore, he activates a GPS tracking application on his mobile phone that sends the GPS coordinates to a server on the Internet. He also instructs that server to send a "WithinArea" event to the shop (using the Mashup module) in case the GPS coordinates are close to the shop.

When entering the shop, activated users are detected and tracked throughout the system. Their position information is exposed to the "shop navigation system" which leads the user to the products on his shopping list.

(2) Fair Scenario

In this scenario, the end user is equipped with either Bluetooth or UWB systems running a new type of MAC that can change its MAC addresses as needed. This new feature might be included in future wireless standards to protect users privacy. The fair system provides the tracking management unit and the tracking stations. They furthermore provide a "Meeting Facility" in which participants can make an appointment and get directions for meeting at the fair. As part of the system setup, end-user register their identity and the devices (with the right MAC for the selected identity) with the tracking management system and allow the "meeting facility" access to the information.

When the time of the appointment comes close, the "Meeting Facility" service tells the Tracking service to track the persons at higher QoS. It then guides them to meet.

Important Aspects are:
1) A tracking management system or unit that controls the tracking stations and defines which device to scan for in which intervals. It furthermore uses older sightings and knowledge about potential walkways to minimize the amount of scans needed to track devices. Technical Improvements: One major feature of the invention is permitting to manage the tracking zones and through that allow much more devices to be tracked.
2) Registration with multiple identities and multiple devices: Technical Improvement: with this features users can register their identities and devices in advance, making the later activation easier. It is also a necessary step to design the system for the user and permit them to opt-in
3) Activation with multiple identities, restricted set of multiple services allowed to get information, identities to be used for tracking, and further operation parameters, e.g. desired QoS, a time schedule
   Technical Improvement: the actual opt-in step. Furthermore it allows to set operational policies, e.g. to which service to send the tracking information and which QoS to use. Both increases the user control.
4) Access module: provides an API and checks that the accesses of services match the given activations.
   Technical Improvements: access functions and access control—a feature for checking the policies defined during activation.

Advantages of the Embodiment of the Present Invention are:

Tracking Management System or Unit: allows scheduling the individual tracking stations. Through that the capacity and speed of the tracking system can be increased, users can be kept in "hidden" mode, the energy consumption—on the mobile devices—can be reduced, and the QoS can be adapted to the need of the services using the tracking system.

User Opt-In through registration and activation: opt-in feature with additional benefit to use multiple identities, multiple devices, and QoS parameters Mash-Up with other services Privacy Preserving through allowing devices to stay in non-discover mode and through opt-in (tracking system can track objects in "invisible/non-discoverable" mode)

Speed: for some of the supported technologies, the ping mode is faster then the discovery mode thus enabling better quality of service Useable with existing technologies: no changes needed on an Bluetooth enabled device Tracking system can utilize future wireless technologies with changing MAC addresses The present invention may be employed as part of a display solutions. That would lead to displays that know who is around them for targeted advertisements: Indoor navigation systems for supermarket, shopping malls, parking garages for surveillance systems: to detect allowed persons and prevent "false" alarms in indoor navigation systems: leading customers to the desired place in a shop in health care and Ambient Assisted Living (AAL): could be used to track people in connection with digital home technologies: tracking users at home, e.g. for multimedia follow-me applications (music follows from room to room)

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A tracking system for determination of the position of devices within a wireless network, wherein the tracking system is comprising a number of tracking stations, each tracking station being adapted for wireless communication with at least one device, characterized by a management unit for control of a tracking activity of the tracking stations,
   wherein the management unit is adapted for scheduling which device shall be pinged by which tracking station, preferably within which time interval, and
   wherein the scheduling is based on previous sightings and/or on the importance of previous sightings of the respective device and/or on the necessary accuracy or QoS (Quality of Service).

2. A tracking system according to claim 1, wherein the tracking stations are adapted for pinging of a device and/or for invoking an operation of a device.

3. A tracking system according to claim 1, wherein the scheduling is based on a potential walkway of the respective device.

4. A tracking system according to claim 1, wherein the tracking stations can be controlled by the management unit for immediately pinging a definable device.

5. A tracking system according to claim 1, wherein the management unit is comprising a registration module for registering a device and/or an identity and/or an access policy.

6. A tracking system according to claim 1, wherein the management unit is comprising an activation module for activation and/or deactivation of tracking of a device.

7. A tracking system according to claim 1, wherein the management unit is comprising an access module for permitting access by services to a tracking information.

8. A tracking system according to claim 1, wherein the management unit is comprising a mash-up module for receiving events and/or information from and/or for communicating with other systems or sources.

9. A tracking system according to claim 8, wherein the other systems or sources are comprising a preferably GPS-based positioning system, a cell-phone and/or a calendar.

10. A tracking system according to claim 8, wherein the mash-up module is comprising an API (Application Programming Interface) with access control.

11. A tracking system according to claim 1, wherein the management unit is comprising a learning module for predicting a movement pattern or a potential walkway of a device.

12. A tracking system according to claim 1, wherein the management unit is comprising a communication module for communication with tracking stations.

13. A tracking system according to claim 1, wherein the management unit is integrated in a tracking station.

14. A tracking system according to claim 1, wherein each tracking station is supporting multiple radio interfaces and/or multiple interfaces of the same technology.

15. A tracking system according to claim 1, wherein the tracking system is realized as part of a display system, an indoor navigation system or a surveillance system.

16. A method for tracking the position of a device within a wireless network, preferably for use with a tracking system according to claim 1, wherein the tracking system is comprising a number of tracking stations, each tracking station being adapted for wireless communication with at least one device, characterized by controlling of a tracking activity of the tracking stations by a management unit.

17. A method according to claim 16, wherein the management unit will perform high precision measurements for devices already discovered in a specific area and/or needing close monitoring, while it occasionally checks for devices coming into a definable range.

18. A method according to claim 16, wherein for tracking stations along a definable or predictable walkway of a device, the device being tracked will be added to a queue of potentially arriving devices at said tracking stations.

19. A method according to claim 16, wherein the tracking will only be started when a positioning system is providing the information that the device might come into a definable range.

20. A method according to claim 16, wherein the management unit is scheduling the time needed to perform one or more trackings of devices.

\* \* \* \* \*

UNITED STATES PATENT AND TRADEMARK OFFICE
CERTIFICATE OF CORRECTION

PATENT NO. : 8,676,228 B2
APPLICATION NO. : 13/147444
DATED : March 18, 2014
INVENTOR(S) : Strohbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 153 days.

Signed and Sealed this

Twenty-ninth Day of September, 2015

Michelle K. Lee
*Director of the United States Patent and Trademark Office*